United States Patent
Cui et al.

(10) Patent No.: US 10,210,605 B2
(45) Date of Patent: Feb. 19, 2019

(54) METHOD AND DEVICE FOR DETECTING BOUNDARY OF REGION ON DISPLAY MOTHERBOARD

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Xiujuan Cui, Beijing (CN); Jingjing Li, Beijing (CN); Juan Li, Beijing (CN); Guilin Liu, Beijing (CN); Hongyan Zhang, Beijing (CN); Shanshan Yu, Beijing (CN); Qiming Li, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 265 days.

(21) Appl. No.: 15/080,839

(22) Filed: Mar. 25, 2016

(65) Prior Publication Data

US 2016/0307062 A1 Oct. 20, 2016

(30) Foreign Application Priority Data

Apr. 20, 2015 (CN) .......................... 2015 1 0188573

(51) Int. Cl.
*H04N 7/18* (2006.01)
*G06T 7/00* (2017.01)
(Continued)

(52) U.S. Cl.
CPC .............. *G06T 7/0008* (2013.01); *G06T 7/13* (2017.01); *G06T 7/90* (2017.01); *H04N 5/247* (2013.01);
(Continued)

(58) Field of Classification Search
CPC ........... G06T 7/0008; G06T 7/13; G06T 7/90; G06T 2207/10024; G06T 2207/20021;
(Continued)

(56) References Cited

U.S. PATENT DOCUMENTS

| 6,111,983 A | 8/2000 | Fenster et al. |
| 7,003,161 B2 | 2/2006 | Tessadro |

(Continued)

FOREIGN PATENT DOCUMENTS

| CN | 1423237 A | 6/2003 |
| CN | 1677430 A | 10/2005 |

(Continued)

OTHER PUBLICATIONS

The Second Office Action dated Jun. 26, 2017 in corresponding Chinese Patent Application No. 201510188573.6.

(Continued)

*Primary Examiner* — Farzana Hossain
(74) *Attorney, Agent, or Firm* — Nath, Goldberg & Meyer; Joshua B. Goldberg

(57) ABSTRACT

The present invention relates to a method and a device for determining regions to be detected on a display motherboard. The method comprises acquiring a first image, acquiring detection parameters of the regions to be detected, acquiring second images which have a resolution higher than that of the first image, and correcting obtained detection parameters based on the second images. Compared with the prior art, the present invention can improve accuracy and efficiency of detection of a display motherboard.

11 Claims, 4 Drawing Sheets

(51) Int. Cl.
*H04N 5/247* (2006.01)
*G06T 7/13* (2017.01)
*G06T 7/90* (2017.01)

(52) U.S. Cl.
CPC ............... *G06T 2207/10024* (2013.01); *G06T 2207/20021* (2013.01); *G06T 2207/30141* (2013.01)

(58) Field of Classification Search
CPC .......... G06T 2207/30141; H04N 5/247; H04N 5/247
USPC ......................................................... 348/87
See application file for complete search history.

(56) References Cited

U.S. PATENT DOCUMENTS

| | | | |
|---|---|---|---|
| 7,270,422 B2 | 9/2007 | Matsuda et al. | |
| 2002/0027653 A1* | 3/2002 | Shibata | G01N 21/9501 356/237.3 |
| 2006/0108525 A1* | 5/2006 | Nakagaki | G03F 7/7065 250/310 |
| 2008/0151080 A1 | 6/2008 | Osaka et al. | |
| 2015/0093039 A1* | 4/2015 | Li | G06L 3/4053 382/266 |
| 2017/0331038 A1* | 11/2017 | Kang | H01L 51/0005 |

FOREIGN PATENT DOCUMENTS

| | | |
|---|---|---|
| CN | 1691744 A | 11/2005 |
| CN | 1904545 A | 1/2007 |
| CN | 101169829 A | 4/2008 |
| CN | 101207710 A | 6/2008 |
| CN | 101821578 A | 9/2010 |
| CN | 103279956 A | 9/2013 |
| CN | 103615980 A | 3/2014 |
| CN | 203518940 U | 4/2014 |
| CN | 104197841 A | 12/2014 |
| CN | 104217416 A | 12/2014 |
| CN | 104268864 A | 1/2015 |
| CN | 104504717 A | 4/2015 |

OTHER PUBLICATIONS

Office Action dated Jan. 24, 2017 issued in corresponding Chinese Application No. 201510188573.6.

* cited by examiner

METHOD AND DEVICE FOR DETECTING BOUNDARY OF REGION ON DISPLAY MOTHERBOARD

CROSS REFERENCE OF RELATIVE APPLICATION

This application claims the benefit of priority to China Patent Application No. 201510188573.6, titled "Method and Device for Determining Regions to be Detected of Display Motherboard" and filed on Apr. 20, 2015, the content thereof being incorporated herein by reference.

FIELD OF THE INVENTION

The present invention belongs to the field of display technology, and in particular relates to a method and a device for determining regions to be detected on a display motherboard.

BACKGROUND OF THE INVENTION

In the manufacturing process of a display device, after the display motherboard is fabricated, the fabricated display motherboard should be subjected to a defect detection. In the defect detection of the display motherboard, detection parameters of regions to be detected on the display motherboard need to be determined at first. For example, when the motherboard of color filter substrate is detected, regions in which color filter substrates are located and frame sizes of the color filter substrates and sizes of effective display areas need to be recognized on the motherboard.

Currently, manners for obtaining the detection parameters of the regions to be detected on the display motherboard typically include the following:

1. obtaining the detection parameters of the regions to be detected by measuring based on design paper of a product; and
2. using a review camera in a detection equipment, determining coordinates of the regions to be detected by visual observation, and then obtaining the detection parameters by calculating.

In the above first manner, due to errors in fabricating process, there is some deviation between an actual product and an ideal product on the design paper. Furthermore, detection parameters of the regions to be detected obtained by the above first manner can hardly be accurately recognized by the detection equipment; that is, deviation may occur when the detection equipment recognizes the detection parameters, and such deviation results in lower detection accuracy. If detection is performed by using the detection parameters obtained in the first manner, false detection may occur. Therefore, the detection parameters need to be adjusted artificially during actual detection, which is time-consuming and affects the production efficiency.

In the above second manner, the equipment itself may have deviation; moreover, the detection accuracy may not be high since the coordinates of the regions to be detected are determined by visual observation. Furthermore, this manner has high requirement on an operator, is time-consuming, and affects the production efficiency.

SUMMARY OF THE INVENTION

An object of the present invention is to resolve at least one of the problems existing in the prior art. The present invention provides a method and a device for determining regions to be detected on a display motherboard, which can determine the detection parameters of the regions to be detected on the display motherboard rapidly and accurately, and thus improves the accuracy and efficiency of detection of a display motherboard.

In order to achieve the object of the present invention, there is provided a method for determining regions to be detected on a display motherboard, comprising the steps:

S1, performing imaging on at least part of the display motherboard to acquire a first image;

S2, obtaining detection parameters of the regions to be detected based on the first image;

S3, acquiring a second image for each region on the motherboard for obtaining the detection parameters from the first image, wherein a resolution of the second image is higher than that of the first image; and S4, correcting the obtained detection parameters of the regions to be detected based on the second image.

Optionally, S1 comprises: acquiring an image of the whole display motherboard as the first image.

Optionally, S2 comprises: recognizing, in the first image, boundaries of the display motherboard, boundaries of each region to be detected, and boundaries of each pattern to be detected in each region to be detected, thereby determining positions of the recognized boundaries as the detection parameters.

Optionally. S3 comprises: for each boundary recognized in S2, acquiring a partial image of the boundary as the second image.

Optionally, S4 comprises: recognizing, in each second image, a position of the boundary shown in this second image, and correcting, based on the position of the boundary recognized in the second image, the position of the boundary determined in S2.

Optionally, S3 comprises: acquiring the second image of each boundary by taking, as an imaging range, a range obtained by extending a same distance towards both sides from a center line that is the position of the boundary determined in S2.

Optionally, S4 comprises: comparing the position of the boundary recognized in the second image with a midline of the second image to determine whether there is a deviation in the position of the boundary recognized in S2, and correcting the position of the boundary recognized in S2 if there is a deviation.

Optionally, the step of recognizing, in the first image, the boundaries of the display motherboard, the boundaries of each region to be detected, and the boundaries of each pattern to be detected within each region to be detected is carried out by using grey-value comparison.

Optionally, the step of recognizing, in each second image, the position of the boundary shown in this second image is carried out by using grey-value comparison.

Optionally, the display motherboard comprises boundaries which are parallel to X direction and Y direction, respectively, each of the regions to be detected comprises boundaries which are parallel to X direction and Y direction, respectively, and each pattern to be detected in each of the regions to be detected comprises boundaries which are parallel to X direction and Y direction, respectively;

comparing grey values of pixels in every two adjacent rows parallel to X direction in the first image; determining a boundary of the display motherboard parallel to X direction based on whether a difference between the grey values of the pixels in two adjacent rows is within a first threshold range; determining a boundary of each region to be detected parallel to X direction based on whether the difference between the grey values of the pixels in two adjacent rows is within a second threshold range; and determining a boundary of each pattern to be detected in each region to be detected parallel to X direction based on whether the difference between the grey values of the pixels in two adjacent rows is within a corresponding threshold range; and comparing grey values of pixels in every two adjacent columns parallel to Y direction in the first image; determining a boundary of the display motherboard parallel to Y direction based on whether a difference between the grey values of the pixels in two adjacent columns is within a first threshold range; determining a boundary of each region to be detected parallel to Y direction based on whether the difference between the grey values of the pixels in two adjacent columns is within a second threshold range; and determining a boundary of each pattern to be detected in each region to be detected parallel to Y direction based on whether the difference between the grey values of the pixels in two adjacent columns is within a corresponding threshold range.

Optionally, the method comprises: comparing the grey values of the pixels in every two adjacent rows/columns in the second image in a direction parallel to the boundary shown in the second image, and determining the boundary shown in the second image based on whether a difference between the grey values of the pixels in two adjacent rows/columns is within a corresponding threshold range.

As another technical solution, the present invention further provides a device for determining regions to be detected on a display motherboard, comprising a first image acquiring unit, a second image acquiring unit, an image recognizing unit, a comparing unit, a position recording unit and a position correcting unit; wherein the first image acquiring unit is configured to perform imaging on at least part of the display motherboard to acquire a first image;

the image recognizing unit is configured to recognize, in the first image, boundaries of the display motherboard, boundaries of each region to be detected, and boundaries of each pattern to be detected within each region to be detected, so as to determine positions of the recognized boundaries, and send the positions of the these boundaries to the position recording unit;

the position recording unit is configured to record the positions of these boundaries;

the second image acquiring unit is configured to acquire a second image for each boundary on the display motherboard that has been recognized in the first image by the image recognizing unit, wherein a resolution of the second image is higher than that of the first image;

the image recognizing unit is further configured to recognize, in each second image, a position of the boundary shown in this second image, and send the position to the comparing unit;

the comparing unit is configured to compare the position of the boundary recognized in each second image by the image recognizing unit with a position, in the first image, of the boundary shown in this second image, and determining whether there is a deviation therebetween; and the position correcting unit is configured to correct the position of the boundary shown in each second image which is recorded by the position recording unit, based on the position of the boundary recognized in this second image by the image recognizing unit, if the comparing unit determines there is a deviation.

Optionally, a resolution of the first image acquiring unit is lower than that of the second image acquiring unit.

Optionally, the display motherboard is a motherboard for color filter substrates.

Optionally, the image recognizing unit determines the boundaries by comparing grey values of pixels in adjacent rows/columns in an image.

The present invention has the following beneficial effects.

In the method and the device for determining regions to be detected on a display motherboard provided by the present invention, a first image of at least part of the display motherboard is acquired at first, and detection parameters of the regions to be detected are obtained from the first image; then, second images with resolution higher than that of the first image are acquired for regions for acquiring the detection parameters, and the obtained detection parameters of the regions to be detected from the first image are corrected based on the second images. Thus, the detection parameters of the regions to be detected can be automatically obtained. Compared to the manually obtaining manner in the prior art, the method of the present invention can determine the detection parameters of the regions to be detected on the display motherboard rapidly and accurately, and thus improves the accuracy and efficiency of the detection of a display motherboard.

Also, the device for determining regions to be detected on a display motherboard provided by the present invention can automatically obtain the detection parameters of the regions to be detected, thereby can determine the detection parameters of the regions to be detected on the display motherboard rapidly and accurately, as compared to the manually obtaining manner in the prior art. Thus, it improves the accuracy and efficiency of the detection of a display motherboard.

BRIEF DESCRIPTION OF THE DRAWINGS

To facilitate further understanding of the invention, accompanying drawings which constitute a part of the specification are provided to explain the invention in conjunction with the following specific embodiments, but are not intended to limit the invention. In the drawings.

DETAILED DESCRIPTION OF THE EMBODIMENTS

Specific embodiments of the present invention are described in detail below in conjunction with the accompanying drawings. It should be noted that the specific embodiments described herein are only for describing and explaining the present invention, not for limiting the present invention.

Figure 1:
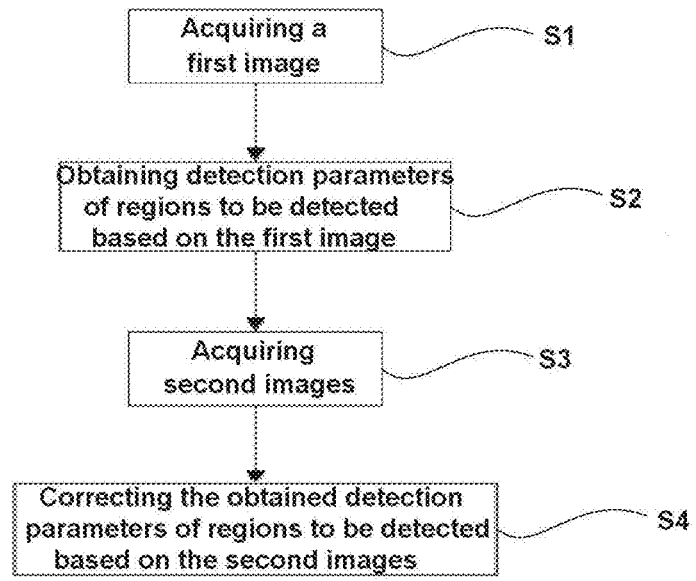
FIG. 1 is a flow chart of a method for determining regions to be detected on a display motherboard provided by an embodiment of the present invention.

The present invention provides an embodiment of a method for determining regions to be detected on a display motherboard. FIG. 1 is a flow chart of a method for determining regions to be detected on a display motherboard provided by the embodiment of the present invention. As shown in FIG. 1, in the present embodiment, the method for determining regions to be detected on a display motherboard comprises the following steps S1 to S4.

S1, acquiring a first image.

Specifically, in step S1, at least part of the display motherboard is imaged so as to acquire the first image.

An image acquiring device with a relatively low resolution may be chosen to acquire the first image so that the first image has a low resolution.

Display content of the first image comprises the whole display motherboard. That is, in step S1, image of the whole display motherboard is acquired as the first image.

The term "display motherboard" may be a motherboard for color filter substrates, or a motherboard for array substrates. In the present embodiment, the motherboard for color filter substrates is taken as an example to explain the method for determining the regions to be detected on the display motherboard.

S2, obtaining detection parameters of the regions to be detected based on the first image.

Generally, the detection parameters of the regions to be detected include positions of each region to be detected on the display motherboard and sizes of patterns in each region to be detected.

Figure 2:
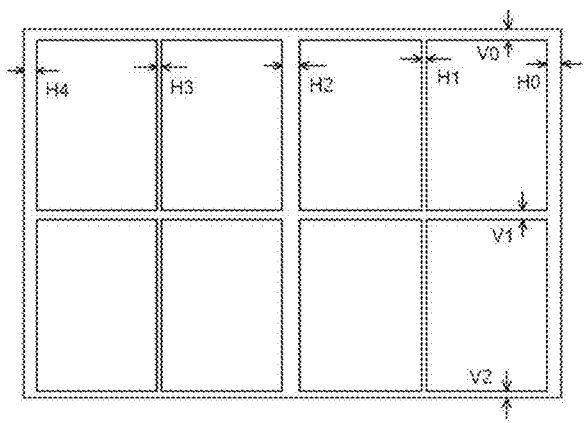
FIG. 2 is a schematic diagram of a motherboard for color filter substrates (also referred to as "color-filter motherboard")
Figure 3:
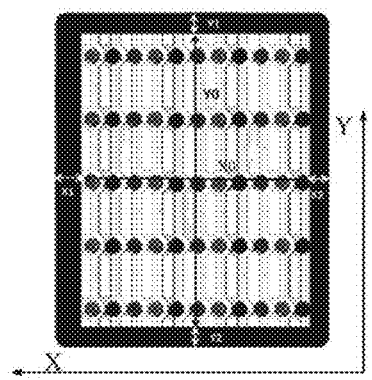
FIG. 3 is a schematic diagram of one of color filter substrates in the color-filter motherboard.

Taking the motherboard for color filter substrates as an example, referring to FIGS. 2 and 3, FIG. 2 is a schematic diagram of a motherboard for color filter substrates, and FIG. 3 is a schematic diagram of one color filter substrate in the color-filter motherboard. The detection parameters of the regions to be detected (i.e., color filter substrates in the present example) comprise a length X0 in X direction and a length Y0 in Y direction of the effective display area of a color filter substrate, and widths of the frame of the color filter substrate, i.e., lengths X1 and X2 in X direction and lengths Y1 and Y2 in Y direction, wherein X direction and Y direction are perpendicular to each other.

The detection parameters of the regions to be detected also comprise a distance of each color filter substrate from each edge of the motherboard for color filter substrates, which is used for determining the position of the color filter substrate on the motherboard for color filter substrates. It should be understood that, in a case that the sizes in X and Y directions of the color filter substrate are known, the distance of one color filter substrate from corresponding edge of the color-filter motherboard, as a detection parameter, may be replaced by a distance, in X direction, between two adjacent color filter substrates in the row of said one color filter substrate (i.e., H1, H2, H3 and the like in FIG. 2), a distance of a color filter substrate located at an end of said row from the nearest edge (in X direction) of the motherboard for color filter substrates (i.e., H0, H4 and the like in FIG. 2), a distance in Y direction between two adjacent color filter substrates in the column of said one color filter substrate (i.e., V1 and the like in FIG. 2), and a distance of a color filter substrate located at an end of said column from the nearest edge (in Y direction) of the motherboard for color filter substrates (i.e., V0, V2 and the like in FIG. 2). Also, in the present embodiment, for convenience, distances in X direction between adjacent color filter substrates in X direction, distances (in X direction) of color filter substrates located at edges in X direction from the nearest edges of the motherboard for color filter substrates, distance in Y direction between adjacent color filter substrates in Y direction, and distances (in Y direction) of color filter substrates located at edges in Y direction from the nearest edges of the motherboard for color filter substrates, are taken as detection parameters.

Specifically, in step S2, in the first image, boundaries of the display motherboard, boundaries of each region to be detected, and boundaries of each pattern to be detected within each region to be detected are recognized, and thereby positions of the recognized boundaries are determined as the detection parameters.

According to the boundaries of the display motherboard and the boundaries of each region to be detected, a position of the region to be detected on the display motherboard may be determined; according to the boundaries of each pattern to be detected within each region to be detected, sizes of patterns to be detected within each region to be detected may be determined. Thus, when the positions of all of the above boundaries are recognized, the detection parameters of the regions to be detected may be obtained.

In step S2, recognizing, in the first image, the boundaries of the display motherboard, the boundaries of each region to be detected, and the boundaries of patterns to be detected within each region to be detected may be carried out by using grey-value comparison.

Figure 4:
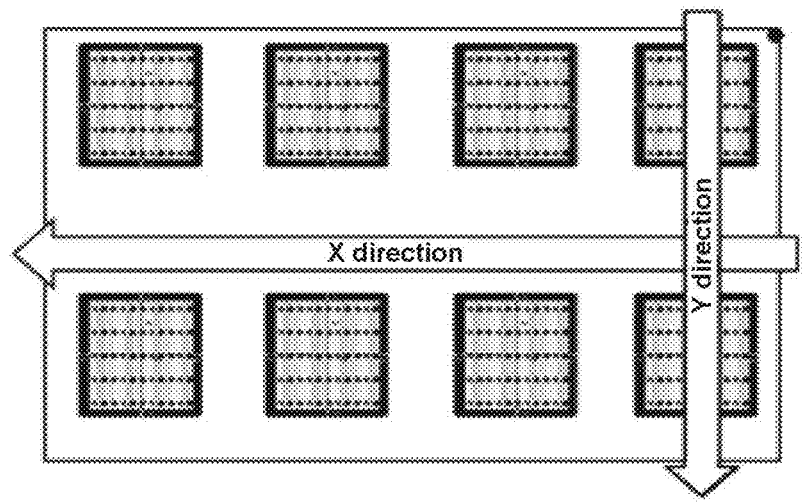
FIG. 4 is a schematic diagram of determining boundaries in X direction and Y direction in the color-filter motherboard.

For example, as shown in FIG. 4, the display motherboard comprises boundaries which are parallel to X direction and Y direction, respectively, each region to be detected comprises boundaries which are parallel to X direction and Y direction, respectively, each pattern to be detected in each region to be detected comprises boundaries which are parallel to X direction and Y direction, respectively, and X directions and Y directions are perpendicular to each other. In this case, grey values of pixels in every two adjacent rows parallel to X direction in the first image are compared; a boundary of the display motherboard parallel to X direction is determined based on whether a difference between the grey values of the pixels in two adjacent rows is within a first threshold range; a boundary of each region to be detected parallel to X direction is determined based on whether the difference between the grey values of the pixels in two adjacent rows is within a second threshold range; and a boundary of each pattern to be detected in each region to be detected parallel to X direction is determined based on whether the difference between the grey values of the pixels in two adjacent rows is within a corresponding threshold range. Specifically, during the above process, gray values of pixels in every two adjacent rows of pixels parallel to X direction are compared in turn, and during the determination of a boundary, the number of times of performed comparison is recorded (the number of times of comparison is the number of times for comparing pixels in adjacent rows; for example, when the first row of pixels are compared with the second row of pixels, the number of times of comparison is recorded as 1; when the second row of pixels are compared with the third row of pixels, the number of times of comparison is recorded as 2; when the third row of pixels are compared with the forth row of pixels, the number of times of comparison is recorded as 3, and so on). Thus, based on the size of each pixel in the first image and a difference between the numbers of times of comparison recorded for two boundaries, which are adjacent in determination time, at the time when they are determined, the distance between the two boundaries may be determined, and this distance is a detection parameter in Y direction. Similarly, all the detection parameters in Y direction may be determined by using such difference between the numbers of times of comparison of every two boundaries, which are adjacent in determination time, recorded at the time when they are determined, and the size of each pixel in the first image.

Specifically, the above process is explained by taking the case in which every two adjacent rows of pixels are compared in turn from up to down in FIG. 2 as an example. In this comparison process, the number of times of comparison recorded when the first boundary is determined is $M_{V1}$, the number of times of comparison recorded when the second boundary is determined is $M_{V2}$, the number of times of comparison recorded when the third boundary is determined is $M_{V3}$, . . . , the number of times of comparison recorded when the last boundary is determined is $M_{V4n+2}$, wherein, n is the number of the regions to be detected in Y direction. Assuming that the size in Y direction of the pixel in the first image is LY, then:

the distance of the uppermost region to be detected from the upper edge of the display motherboard, i.e., the detection parameter $V0=(M_{V2}-M_{V1})\times LY$;

in the uppermost region to be detected, the size, in Y direction, of the effective display area, i.e., the detection parameter $Y0=(M_{V4}-M_{V3})\times LY$;

in the uppermost region to be detected, the width of its upper frame, i.e., the detection parameter $Y1=(M_{V3}-M_{V2})\times LY$; the width of its lower frame, i.e., the detection parameter $Y2=(M_{V5}-M_{V4})\times LY$;

the distance between the uppermost region to be detected and the region to be detected located therebelow and adjacent thereto, i.e., the detection parameter $V1=(M_{V6}-M_{V5})\times LY$;

The process for obtaining other detection parameters in Y direction is similar to the above process, thus it will not be repeated here.

Similarly, grey values of pixels in every two adjacent rows parallel to Y direction in the first image are compared; a boundary of the display motherboard parallel to Y direction is determined based on whether a difference between the grey values of the pixels in two adjacent rows is within a first threshold range; a boundary of each region to be detected parallel to Y direction is determined based on whether the difference between the grey values of the pixels in two adjacent rows is within a second threshold range; and a boundary of each pattern to be detected in each region to be detected parallel to Y direction is determined based on whether the difference between the grey values of the pixels in two adjacent rows is within a corresponding threshold range. Specifically, during the above process, gray values of pixels in every two adjacent rows of pixels parallel to Y direction are compared in turn, and when a boundary is determined, the number of times of performed comparison is recorded. Thus, based on the size of each pixel in the first image and a difference between the numbers of times of comparison recorded for two boundaries, which are adjacent in determination time, at the time when they are determined, the distance between the two boundaries may be determined, and this distance is a detection parameter in X direction. Similarly, all of the detection parameters in X direction may be determined by using such difference between the numbers of times of comparison of every two boundaries, which are adjacent in determination time, recorded at the time when they are determined and the size of each pixel in the first image.

Specifically, the above process is explained by taking the case in which every two adjacent columns of pixels are compared in turn from right to left in FIG. 2 as an example. In this comparison process, the number of times of comparison recorded when the first boundary is determined is $M_{H1}$, the number of times of comparison recorded when the second boundary is determined is $M_{H2}$, the number of times of comparison recorded when the third boundary is determined is $M_{H3}$, . . . , the number of times of comparison recorded when the last boundary is determined is $M_{H4m+2}$, wherein, in is the number of the regions to be detected in X direction. Assuming that the size, in X direction, of the pixel in the first image is LX, then:

the distance of the rightmost region to be detected from the right edge of the display motherboard, i.e., the detection parameter $H0=(M_{H2}-M_{H1})\times LX$;

in the rightmost region to be detected, the size, in X direction, of the effective display area, i.e., the detection parameter $X0=(M_{H4}-M_{H3})\times LX$;

in the rightmost region to be detected, the width of its right frame, i.e., the detection parameter $X1=(M_{H3}-M_{H})\times LX$; the width of its left frame, i.e., the detection parameter $X2=(M_{H5}-M_{H4})\times LX$;

the distance between the rightmost region to be detected and the region to be detected located on the left thereof and adjacent thereto, i.e., the detection parameter $H1=(M_{H6}-M_{H5})\times LX$;

The process for obtaining other detection parameters in X direction is similar to the above process, thus it will not be repeated no more.

In the present embodiment, since the first image acquired in step S1 has a relatively low resolution, that is, the numbers of rows and columns in the first image are relatively small, and time required for performing grey-value comparison is short, thus reducing time required for obtaining the detection parameters of the regions to be detected, improving detection speed and meeting the production requirement.

S3, acquiring second images.

For each region on the motherboard used for obtaining the detection parameters from the first image, a second image is acquired, wherein a resolution of the second image is higher than that of the first image.

Specifically, in step S3, for each boundary recognized in step S2, a partial image of the boundary is acquired as a second image, and each of the second images has a resolution larger than that of the first image. An image acquiring device with a higher resolution may be chosen to perform the process of acquiring the second images in step S3.

S4, correcting the obtained detection parameters of the regions to be detected based on the second image.

Specifically, in step S4, in each of the second images, the position of each boundary shown in the second image is recognized, and the position of this boundary determined in step S2 is corrected based on the position of the boundary recognized from the second image.

Similar to step S2, in step S4, the boundary shown in the second image may also be recognized in the second image by grey-value comparison. That is, the grey values of pixels in every two adjacent rows/columns of pixels in the second image in a direction parallel to the boundary shown in the second image are compared, and the boundary shown in the second image is determined based on whether the differences between the grey values of two adjacent rows/columns of pixels are within a corresponding threshold range.

Figure 5:
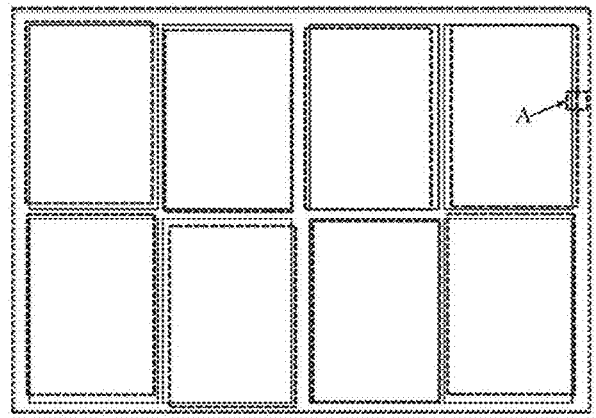
FIG. 5 is a schematic diagram showing an acquisition region of a second image.
Figure 6:
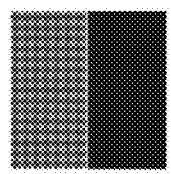
FIG. 6 is a schematic diagram showing a case where a boundary recognized in the second image coincides with a position of this boundary determined in step S2.
Figure 7:
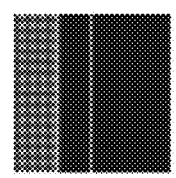
FIG. 7 is a schematic diagram showing a case where the boundary recognized in the second image is located inside the boundary determined in step S2.
Figure 8:
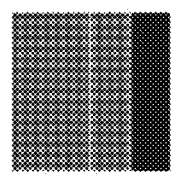
FIG. 8 is a schematic diagram showing a case where the boundary recognized in the second image is located outside the boundary determined in step S2.

For example, as shown in FIG. 5, the dashed frames indicates the boundaries of the color filter substrates and the motherboard for color filter substrates acquired in step S2, and the solid-line frames indicates "more accurate" boundaries of the color filter substrates and the motherboard for color filter substrates (e.g., boundaries acquired by an image acquiring device having a higher resolution than that of the image acquiring device used in step S2). In step S3, an image of part A in this figure is acquired as a second image. From FIG. 5, it can be seen that, the boundary shown in the second image is a boundary in Y direction of a color filter substrate. In this case, in step S4, along X direction (either from left side to right side or from right side to left side in FIG. 5), grey values of pixels in every two adjacent rows of pixels are compared in turn, and the position of the boundary shown in the second image is re-determined in the second image based on whether a difference between the grey values of the pixels in two adjacent rows is within a corresponding threshold range. As shown in FIG. 6, if the re-determined position of the boundary coincides with the position of this boundary determined in step S2 (for ease of explanation, the two positions are indicated by white lines in FIG. 6), it means that the position of the boundary determined in step S2 is accurate, and does not need to be corrected. As shown in FIGS. 7 and 8, if the re-determined position of the boundary does not coincide with the position of this boundary determined in step S2 (for ease of explanation, the two positions are indicated by two white lines in each of FIGS. 7 and 8), it means that the position of the boundary determined in step S2 needs to be corrected. Specifically, the position of this boundary determined in step S2 may be converted into a position in the second image, the number of the pixels between the converted position and the position of this boundary determined in step S4 is calculated, and then is multiplied by the size in X direction of each pixel in the second image, thus, obtaining a value by which the boundary determined in step S2 needs to be adjusted. The conversion method used for converting the position of the boundary from the first image to that in the second image may be any method known by an ordinary skilled person in the art, thus its description is omitted herein.

Preferably, in order to acquire the second image for each boundary in step S3, the position of the boundary determined in step S2 is taken as a center line, and an image within a range which is obtained by extending from the center line towards both sides thereof for a same distance is acquired as the second image. In this way, a midline of the second image may become the position of the boundary determined in step S2. In this case, in step S4, the position of the recognized boundary is compared with the midline of the second image, to determine whether there is a deviation between the positioned of the boundary determined in step S2 and the midline. If there is a deviation, the positioned of the boundary determined in step S2 is corrected. Thus, there is no need to convert the positioned of the boundary determined in step S2 to the second image through complicated calculation. That is, it is more convenient to determine whether there is a deviation in the positioned of the boundary determined in step S2, and more convenient to obtain the value required for adjusting the position if there is a deviation.

In the present embodiment, the resolution of the second image is larger than that of the first image, thus, the position of the boundary recognized from the second image is more accurate, an that the position recognized from the second image can be taken as a reliable and accurate reference for correcting the position of the boundary determined in step S2, to make the detection parameters of the regions to be detected determined by the present invention more accurate.

In the method for determining regions to be detected on a display motherboard provided by the present embodiment, a first image of the display motherboard is acquired at first, and then, second images with a resolution higher than that of the first image are acquired, and the obtained detection parameters of the regions to be detected from the first image are corrected based on the second images. Thus, the detection parameters of the regions to be detected can be automatically obtained. Compared to the manually obtaining manner in the prior art, the method of the present invention can determine the detection parameters of the regions to be detected on the display motherboard rapidly and accurately, and thus improves the accuracy and efficiency of the detection of the display motherboard.

Figure 9:
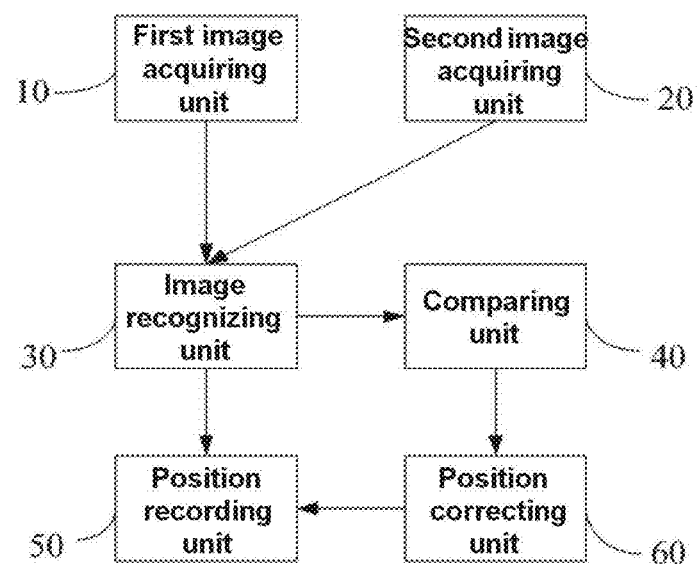
FIG. 9 is a schematic diagram of a device for determining regions to be detected on a display motherboard provided by an embodiment of the present invention.

The present invention further provides a device for determining regions to be detected on a display motherboard. FIG. 9 is a schematic diagram of a device for determining regions to be detected on a display motherboard provided by an embodiment of the present invention. As shown in FIG. 9, in the present embodiment, the device for determining regions to be detected on a display motherboard comprises a first image acquiring unit 10, a second image acquiring unit 20 an image recognizing unit 30, a comparing unit 40, a position recording unit 50 and a position correcting unit 60.

In the present embodiment, the first image acquiring unit 10 is configured to acquire the image of the display motherboard as the first image. The image recognizing unit 30 is configured to recognize, in the first image, boundaries of the display motherboard, boundaries of each region to be detected, and boundaries of patterns to be detected within each region to be detected, so as to determine positions of the recognized boundaries, and send positions of these boundaries to the position recording unit 50. The position recording unit 50 is configured to record the positions of these boundaries. The second image acquiring unit 20 is configured to acquire, with a higher resolution, an image of each boundary recognized from the first image by the image recognizing unit 30, to obtain a plurality of second images. Thus, each of the second images has a higher resolution than that of the first image. The image recognizing unit 30 is further configured to recognize, in each second image, a position of the boundary shown in this second image, and send the position to the comparing unit 40. The comparing unit 40 is configured to compare the position of the boundary recognized from each second image by the image recognizing unit 30 with a position, in the first image, of this boundary shown in this second image, and determining whether there is a deviation therebetween. The position correcting unit 60 is configured to correct the position, which is recorded by the position recording unit 50, of the boundary shown in each second image, based on the position of the boundary recognized by the image recognizing unit 30 from this second image, in the case that the comparing unit 40 has determined that there is a deviation.

In the present embodiment, the mage recognizing unit 30 recognizes, from the first image, boundaries of the display motherboard, boundaries of each region to be detected, and boundaries of patterns to be detected within each region to be detected. The recognizing principle and process have been described in detail in the above embodiment of the method for determining regions to be detected on a display motherboard, thus, it is not repeated no more. After all of the boundaries are recognized by the image recognizing unit 30, the position recording unit 50 records the positions of the boundaries.

Moreover, the image recognizing unit 30 recognizes the position of the boundary shown in each second image from this second image. The recognizing principle and process have been described in detail in the above embodiment of the method for determining regions to be detected on a display motherboard, thus, it is not repeated here. The comparing unit 40 compares the position of the boundary recognized from the second image by the image recognizing unit 30 with the position of this boundary recorded by the position recording unit 50. If the two coincide with each other, it means that the position of this boundary recognized from the first image by the image recognizing unit 30 is accurate. If there is a deviation between the two positions, it means that the position of this boundary recognized from the first image by the image recognizing unit 30 is not accurate, and in this case, the position correcting unit 60 corrects the position of this boundary recorded by the position recording unit 50. The correcting process has been described in detail in the above embodiment of the method for determining regions to be detected on a display motherboard, thus, it is not repeated here.

In the device for determining regions to be detected on a display motherboard provided by the present embodiment, the first image acquiring unit 10 acquires a first image, the image recognizing unit 30 recognizes respective boundaries from the first image to preliminarily determine detection parameters of the regions to be detected, and the position recording unit 50 records the preliminarily recognized detection parameters; then, the second image acquiring unit 20 acquires second images, the image recognizing unit 30 re-recognizes boundaries shown in the second images from the second images, the comparing unit 40 compares the position of each re-recognized boundary with the preliminarily determined position of this boundary, and in a case that the two positions do not coincide with each other, the position correcting unit 60 corrects the preliminarily determined position of the boundary so as to make it more accurate. Thus, the detection parameters of the regions to be detected can be automatically obtained. Compared to the manually obtaining manner in the prior art, the method of the present invention can determine the detection parameters of the regions to be detected on the display motherboard rapidly and accurately, and thus improves the accuracy and efficiency of the detection of the display motherboard.

In the present embodiment, pixel density of the second image is higher than that of the first image so that the accuracy of the boundary recognized from the second image is higher than that from the first image. In this case, preferably, the resolution of the second acquiring unit is higher than that of the first acquiring unit. In this way, on the premise that the range of the second image acquired by the second acquiring unit is smaller than the range of the first image acquired by the first acquiring unit, the pixel density of the second image can be made even higher than the pixel density of the first image so as to improve the accuracy of the boundary recognized from the second image.

In the present embodiment, the display motherboard may be a motherboard for array substrates, or a motherboard for color filter substrates.

Specifically, the image recognizing unit determines each boundary by comparing grey values of pixels in adjacent rows/columns pixels in an image. The method and process for determining individual boundaries by grey-value comparison have been described in detail in the above embodiment of the method for determining regions to be detected on a display motherboard, thus, it is not repeated here.

It will be understood that the foregoing embodiments are merely exemplary embodiments used for describing the principle of the present invention. However, the present invention is not limited thereto. A person having ordinary skill in the relevant art may make various modifications and variations without departing from the spirit and scope of the present invention, and these modifications and variations shall fall into the protection scope of the present invention.

The invention claimed is:

1. A method for detecting positions and dimensions of a display substrate and a display region of the display substrate in a display motherboard, comprising:
   S1, acquiring a first image by imaging an entirety of the display motherboard;
   S2, detecting boundaries of the display motherboard, the display substrate and the display region of the display substrate in the first image by comparing grey values of pixels in adjacent rows and comparing grey values of pixels in adjacent columns, and determining positions of the boundaries in the first image;
   S3, acquiring a second image by imaging a part of the display motherboard containing a portion of each boundary detected in the first image, wherein a resolution of the second image is higher than that of the first image; and
   S4, detecting the boundary in the second image by comparing grey values of pixels in adjacent rows and comparing grey values of pixels in adjacent columns, and determining the position of the boundary in the second image, then determining whether there is a deviation between the position of the boundary in the second image and the position of the corresponding boundary in the first image, and in a case where there is the deviation between the position of the boundary in the second image and the position of the corresponding boundary in the first image, correcting the position of the corresponding boundary in the first image based on the position of the boundary in the second image, and determining the positions and the dimensions of the display substrate and the display region of the display substrate in the display motherboard according to the corrected positions of the boundaries in the first image.

2. The method of claim 1, wherein the second image has a range obtained by extending a same distance towards both sides from a center line that is the position of the boundary determined in S2.

3. The method of claim 2, wherein S4 comprises: determining whether there is a deviation between the position of the boundary in the second image and the center line of the second image, and in a case where there is a deviation between the position of the boundary in the second image and the center line of the second image, correcting the position of the corresponding boundary in the first image based on the position of the boundary in the second image.

4. The method of claim 1, wherein the display motherboard comprises boundaries which are parallel to X direction and Y direction, respectively, and S2 comprises:
   comparing grey values of pixels in adjacent rows parallel to X direction in the first image, and in a case where there is a difference between the grey values of the pixels in the adjacent rows and the difference is within a predetermined threshold range, determining the position of the boundary parallel to X direction being between the adjacent rows; and comparing grey values of pixels in adjacent columns parallel to Y direction in the first image, and in a case where there is a difference between the grey values of the pixels in the adjacent columns and the difference is within the predetermined threshold range, determining the position of the boundary parallel to Y direction being between the adjacent columns.

5. The method of claim 1, wherein the display motherboard comprises boundaries which are parallel to X direction and Y direction, respectively, and S4 comprises:

comparing grey values of pixels in adjacent rows parallel to X direction in the second image, and in a case where there is a difference between the grey values of the pixels in the adjacent rows and the difference is within a predetermined threshold range, determining the position of the boundary parallel to X direction being between the adjacent rows; and comparing grey values of pixels in adjacent columns parallel to Y direction in the second image, and in a case where there is a difference between the grey values of the pixels in the adjacent columns and the difference is within the predetermined threshold range, determining the position of the boundary parallel to Y direction being between the adjacent columns.

6. A device for detecting positions and dimensions of a display substrate and a display region of the display substrate in a display motherboard, configured to:

acquire a first image by imaging an entire of the display motherboard;

detect the boundaries of the display motherboard, the display substrate and the display region of the display substrate in the first image by comparing grey values of pixels in adjacent rows and comparing grey values of pixels in adjacent columns, and determine positions of the boundaries in the first image;

acquire a second image by imaging a part of the display motherboard containing a portion of each boundary detected in the first image, wherein a resolution of the second image is higher than that of the first image; and detect the boundary in the second image by comparing grey values of pixels in adjacent rows and comparing grey values of pixels in adjacent columns, and determine the position of the boundary in the second image, then determining whether there is a deviation between the position of the boundary in the second image and the position of the corresponding boundary in the first image, and in a case where there is the deviation between the position of the boundary in the second image and the position of the corresponding boundary in the first image, correct the position of the corresponding boundary in the first image based on the position of the boundary in the second image, and determining the positions and the dimensions of the display substrate and the display region of the display substrate in the display motherboard according to the corrected positions of the boundaries in the first image.

7. The device of claim 6, wherein the display motherboard is a motherboard for color filter substrates, and the display substrate is one of the color filter substrates.

8. The device of claim 6, wherein the second image has a range obtained by extending a same distance towards both sides from a center line that is the position of the boundary in the first image.

9. The device of claim 8, configured to:

determine whether there is a deviation between the position of the boundary in the second image and the center line of the second image, and in a case where there is a deviation between the position of the boundary in the second image and the center line of the second image, correct the position of the corresponding boundary in the first image based on the position of the boundary in the second image.

10. The device of claim 6, wherein the display motherboard comprises boundaries which are parallel to X direction and Y direction, respectively, and the device is configured to:

compare grey values of pixels in adjacent rows parallel to X direction in the first image, and in a case where there is a difference between the grey values of the pixels in the adjacent rows and the difference is within a predetermined threshold range, determine the position of the boundary parallel to X direction being between the adjacent rows; and compare grey values of pixels in adjacent columns parallel to Y direction in the first image, and in a case where there is a difference between the grey values of the pixels in the adjacent columns and the difference is within a predetermined threshold range, determine the position of the boundary parallel to X direction being between the adjacent columns.

11. The device of claim 6, wherein the display motherboard comprises boundaries which are parallel to X direction and Y direction, respectively, and the device is configured to:

compare grey values of pixels in adjacent rows parallel to X direction in the second image, and in a case where there is a difference between the grey values of the pixels in the adjacent rows and the difference is within a predetermined threshold range, determining the position of the boundary parallel to X direction being between the adjacent rows; and compare grey values of pixels in adjacent columns parallel to Y direction in the second image, and in a case where there is a difference between the grey values of the pixels in the adjacent columns and the difference is within the predetermined threshold range, determining the position of the boundary parallel to Y direction being between the adjacent columns.

\* \* \* \* \*